US009602956B1

United States Patent
Jin et al.

(10) Patent No.: US 9,602,956 B1
(45) Date of Patent: Mar. 21, 2017

(54) SYSTEM AND METHOD FOR DEVICE POSITIONING WITH BLUETOOTH LOW ENERGY DISTRIBUTIONS

(71) Applicant: YAHOO! INC., Sunnyvale, CA (US)

(72) Inventors: Haojian Jin, Santa Clara, CA (US); Kent Lyons, Santa Clara, CA (US); Cheng Xu, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/834,582

(22) Filed: Aug. 25, 2015

(51) Int. Cl.
*H04B 7/00* (2006.01)
*H04W 4/00* (2009.01)
*H04B 17/318* (2015.01)
*H04W 4/02* (2009.01)

(52) U.S. Cl.
CPC .......... *H04W 4/008* (2013.01); *H04B 17/318* (2015.01); *H04W 4/025* (2013.01)

(58) Field of Classification Search
None
See application file for complete search history.

(56) References Cited

U.S. PATENT DOCUMENTS

| 2014/0171114 | A1* | 6/2014 | Marti | G01C 21/10 455/456.2 |
| 2015/0163748 | A1* | 6/2015 | Hrabak | H04W 52/0245 455/41.2 |
| 2016/0063847 | A1* | 3/2016 | Hawkins | G08B 21/24 340/539.11 |

OTHER PUBLICATIONS

Chen, K. Y., Ashbrook, D., Goel, M., Lee, S. H., & Patel, S. (Sep. 2014). AirLink: sharing files between multiple devices using in-air gestures. InProceedings of the 2014 ACM International Joint Conference on Pervasive and Ubiquitous Computing (pp. 565-569). ACM.
Goel, M., Lee, B., Islam Aumi, M. T., Patel, S., Borriello, G., Hibino, S., & Begole, B. (Apr. 2014). SurfaceLink: using intertial and acoustic sensing to enable multi-device interaction on a surface. In Proceedings of the 32nd annual ACM conference on Human factors in computing systems (pp. 1387-1396). ACM.
Hinckley, K., Ramos, G., Guimbretiere, F., Baudisch, P., & Smith, M. (May 2004). Stitching: pen gestures that span multiple displays. In Proceedings of the working conference on Advanced visual interfaces (pp. 23-31). ACM.
Luo, J., & Zhan, X. (2014). Characterization of Smart Phone Received Signal Strength Indication for WLAN Indoor Positioning Accuracy Improvement. Journal of Networks, 9(3), 739-746.

(Continued)

*Primary Examiner* — Mohammed Rachedine
(74) *Attorney, Agent, or Firm* — James J. DeCarlo; Greenberg Traurig, LLP

(57) ABSTRACT

Disclosed are systems and methods for improving interactions with and between computers in a communication system supported by or configured with personal computing devices, servers and/or platforms. The systems interact to identify and retrieve data across computers and platforms, which can be used to improve the quality of data used in processing interactions between or among processors in such systems. The disclosed systems and methods perform spatial sensing in order to locate adjacent devices via asymmetric Bluetooth Low Energy (BLE) received signal strength indication (RSSI) distributions. Such spatial location between adjacent devices enables the devices to communicate, share, generate and/or consume digital information as a single, connected and/or localized logical unit.

18 Claims, 7 Drawing Sheets

(56) References Cited

OTHER PUBLICATIONS

Potorti, F., Corucci, A., Nepa, P., Furfari, F., Barsocchi, P., & Buffi, A. (Jun. 2009). Accuracy limits of in-room localisation using RSSI. In Antennas and Propagation Society International Symposium, 2009. APSURSI'09. IEEE (pp. 1-4). IEEE.

Quan, M., Navarro, E., & Peuker, B. (2010). Wi-Fi Localization Using RSSI Fingerprinting; 6 pages.

Wang, Y., Yang, X., Zhao, Y., Liu, Y., & Cuthbert, L. (Jan. 2013). Bluetooth positioning using RSSI and triangulation methods. In Consumer Communications and Networking Conference (CCNC), 2013 IEEE (pp. 837-842). IEEE.

Weiser, M. (1991). The computer for the 21st century. Scientific american,265(3), 94-104.

Rädle, R., Jetter, H. C., Marquardt, N., Reiterer, H., & Rogers, Y. (Nov. 2014). HuddleLamp: Spatially-Aware Mobile Displays for Ad-hoc Around-the-Table Collaboration. In Proceedings of the Ninth ACM International Conference on Interactive Tabletops and Surfaces (pp. 45-54). ACM.

Zhang, Z., Chu, D., Chen, X., & Moscibroda, T. (Jun. 2012). Swordfight: enabling a new class of phone-tophone action games on commodity phones. In Proceedings of the 10th international conference on Mobile systems, applications, and services (pp. 1-14). ACM.

Marquardt, N., Hinckley, K., & Greenberg, S. (Oct. 2012). Cross-device interaction via micro-mobility and f-formations. In Proceedings of the 25th annual ACM symposium on User interface software and technology (pp. 13-22). ACM.

* cited by examiner

SYSTEM AND METHOD FOR DEVICE POSITIONING WITH BLUETOOTH LOW ENERGY DISTRIBUTIONS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of communicating computer systems and/or platforms by modifying the capabilities and enabling non-native functionality in such computer systems to perform spatial sensing in order to identify and locate adjacent devices.

SUMMARY

The present disclosure provides systems and methods for spatial sensing in order to locate adjacent devices via asymmetric Bluetooth Low Energy (BLE) received signal strength indication (RSSI) distributions. According to some embodiments, the disclosed systems and methods enable a computing device to implicitly locate the position of adjacently positioned devices.

Current off-the-shelf (or commodity) devices place the wireless antenna at a corner of a device due to the large size of the battery (e.g., the top right (or left) corner of a mobile device when the device is positioned upright). The resulting off-center antenna produces an asymmetric radio frequency field and associated RSSI distribution around the device. By measuring a real-time (or near real-time) BLE signal strength sequence communicated by the device (or between the devices), and comparing it to predetermined (or pre-collected) distributions of RSSI values, the disclosed systems and methods are able to determine the relative positions of adjacent devices. Once such positioning is determined, communications can be facilitated between the determining device and discovered adjacent device(s), whereby such devices can be wirelessly tethered together, and/or can form a connected pair for purposes of sharing, generating and/or consuming content/media.

It will be recognized from the disclosure herein that embodiments provide improvements to a number of technology areas, for example those related to systems and processes that handle or process spatial information associated with devices and/or around a device or at a location, thereby enabling such devices to identify other devices and communicate or share with such devices. Embodiments of the disclosed systems and methods can effectuate improvements in how paired devices communicate, share and/or consume media, as the disclosed systems and methods not only provide an improvement in identifying adjacent or paired devices, but also enable improved communications between such devices based on the RSSI and BLE signals being communicated between each device.

In accordance with one or more embodiments, a method is disclosed which includes identifying, via a first computing device, a second device at a location; recording, via the first computing device, received signal strength indication (RSSI) data communicated between the first and second devices, the RSSI data comprising information associated with Bluetooth Low Energy (BLE) signals exchanged between the first device and the second device; comparing, via the first computing device, the recorded RSSI data against a RSSI data model associated with the first computing device, the comparison of the recorded RSSI data and the RSSI data model performed in accordance with a similarity threshold; determining, via the first computing device, a position of the second device with respect to the first device based on the comparison, the position determination occurring upon the recorded and modeled RSSI data comparison satisfying the similarity threshold; and forming, via the first computing device, a logical unit comprising the first computing device and second computing device, wherein the first computing device and the second computing device are enabled to process information as a connected pair of devices.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for spatial sensing in order to locate adjacent mobile devices via asymmetric Bluetooth Low Energy (BLE) received signal strength indication (RSSI) distributions.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
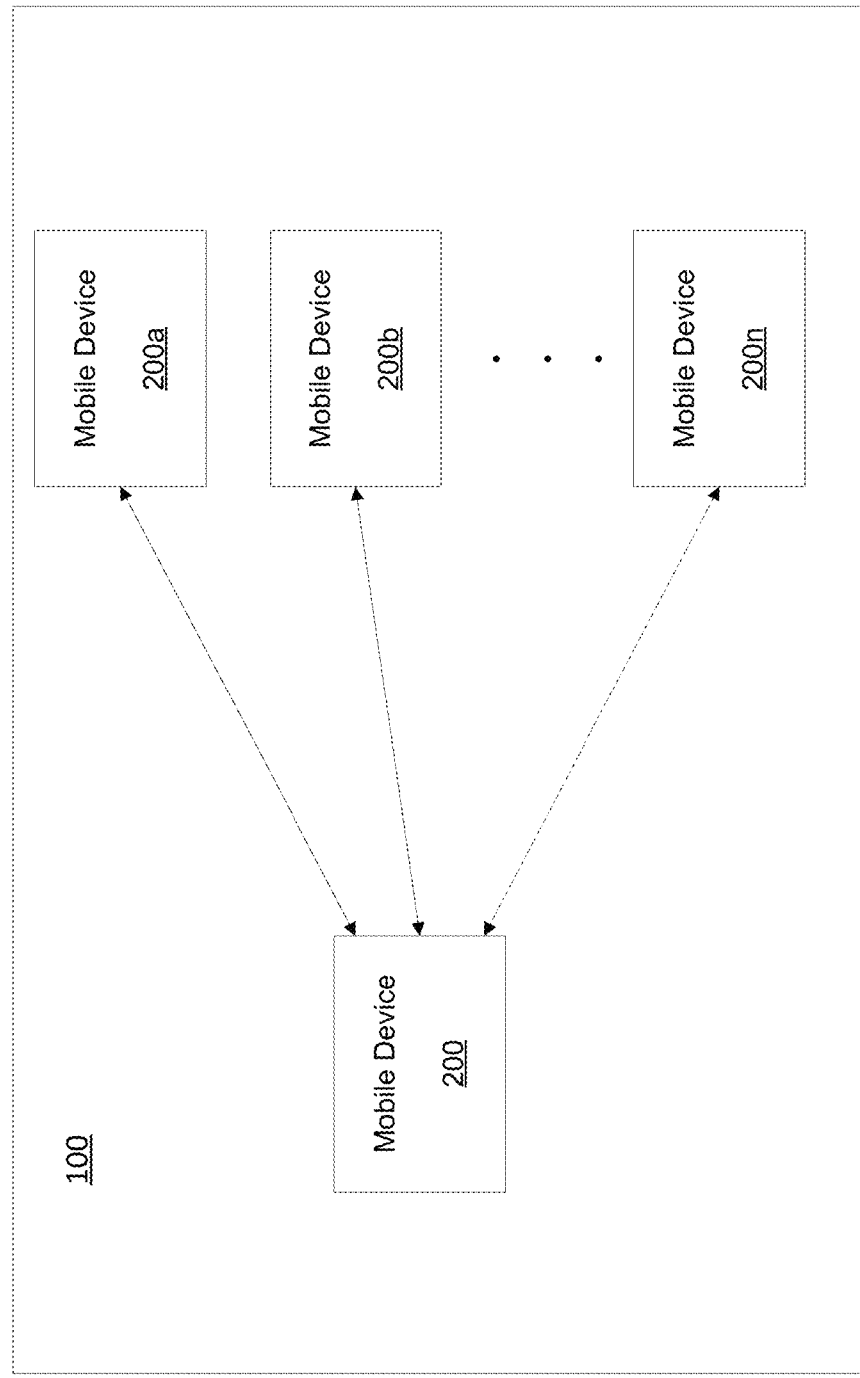
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, interacting with multiple devices at the same time and switching between them has become a common task for users in their daily life. While there are conventional communication technologies for these devices (e.g., Bluetooth®, WiFi®), selecting which device to initiate a connection with remains a challenge. For example, many cross device file sharing activities fall back to email even when the target device is just inches away.

The present disclosure remedies these shortcomings, among others, by providing a technique for a device to implicitly locate an adjacent device(s). According to some embodiments, the disclosed systems and methods leverage asymmetric radio frequency field patterns of devices to locate adjacent devices in order to facilitate communication between such devices.

Current commercial-off-the-shelf (COTS) devices place the wireless antenna at a corner of a device due to the large size of the battery (e.g., a top corner of a mobile device when the device is positioned upright). The asymmetry is a by-product of, but is not limited to, the off-center placement of the antenna, the antenna design and material, and shielding properties of known and to be known devices. The resulting off-center antenna produces an asymmetric radio frequency field and associated RSSI distribution around the device.

The disclosed systems and methods can map such asymmetry though continuous (and/or periodic) RSSI scanning in order to develop RSSI distribution models that correspond to different positions around a device. The instant disclosure utilizes such RSSI distribution models when measuring a real-time (or near real-time) BLE signal strength sequence communicated by the device (or between devices), and compares it to predetermined (or pre-collected) distributions of RSSI values. Based on such comparison, the disclosed systems and methods are able to determine the relative positions of adjacent devices. Once such positioning is determined, communications can be facilitated between adjacent devices.

As discussed in more detail below, a computing device can employ the disclosed systems and methods to determine other devices' presence at a location from a collection of signal information. The signal information can be based on those device's RSSI and/or BLE signals. According to some embodiments, the signal information can also be based on a determined distance and/or direction between devices from the difference in arrival times of multiple exchanged inaudible acoustic (or stereo) signals. According to some embodiments, the signal information can be based on orientation and/or motion information detected using inertial sensors that each device is standardly equipped with or by detecting Doppler shift in detected signals. Thus, the disclosed systems and methods readily enable ad-hoc, spatial cross-device detection and interaction between devices within a predetermined proximity without the need for calibration or cross-calibration by solely using components found in known or to be known mobile devices. In some embodiments, the disclosed systems and methods can be implemented by cross-device applications on mobile devices.

The present disclosure will now be described more fully with reference to the accompanying drawings, in which various embodiments of the disclosure are shown. The disclosure may, however, be embodied in many different forms and should not be construed as being limited to the embodiments set forth herein.

FIG. 1 is a diagram illustrating a spatial mapping system according to some embodiments of the present disclosure. Not all the components may be required to practice the disclosure, and variations in the arrangement and type of the components may be made without departing from the spirit or scope of the disclosure. The spatial mapping system, according to some embodiments of the present disclosure, may include mobile devices 200, 200a, 200b, and ... 200n located at and around a location 100 (where device 200n signifies that there can be any number of devices intermittently positioned around device 200, and/or about the location).

As discussed in more detail below, according to some embodiments, the distance between device 200 and devices 200a-200n at location 100 is a relatively small distance, such as, those distances currently required for enabling Bluetooth®, Near Field Communication (NFC), infrared, and/or any other type of wireless communication between closely situated connected devices. According to some embodiments, the distance between devices 200 and 200a-200n at location 100 is at or below a distance threshold measure. For example, 2 cm or 3 cm. Current technology available to COTS devices enables device communications (e.g., via BLE) at or above an accuracy threshold only at such equivalent distances. However, one of skill in the art would understand that for purposes of this disclosure, advances in the hardware and capabilities of COTS and BLE devices will enable the distance to expand beyond such Bluetooth, and the like, distances and still satisfy the accuracy threshold required for this disclosure.

Figure 5:
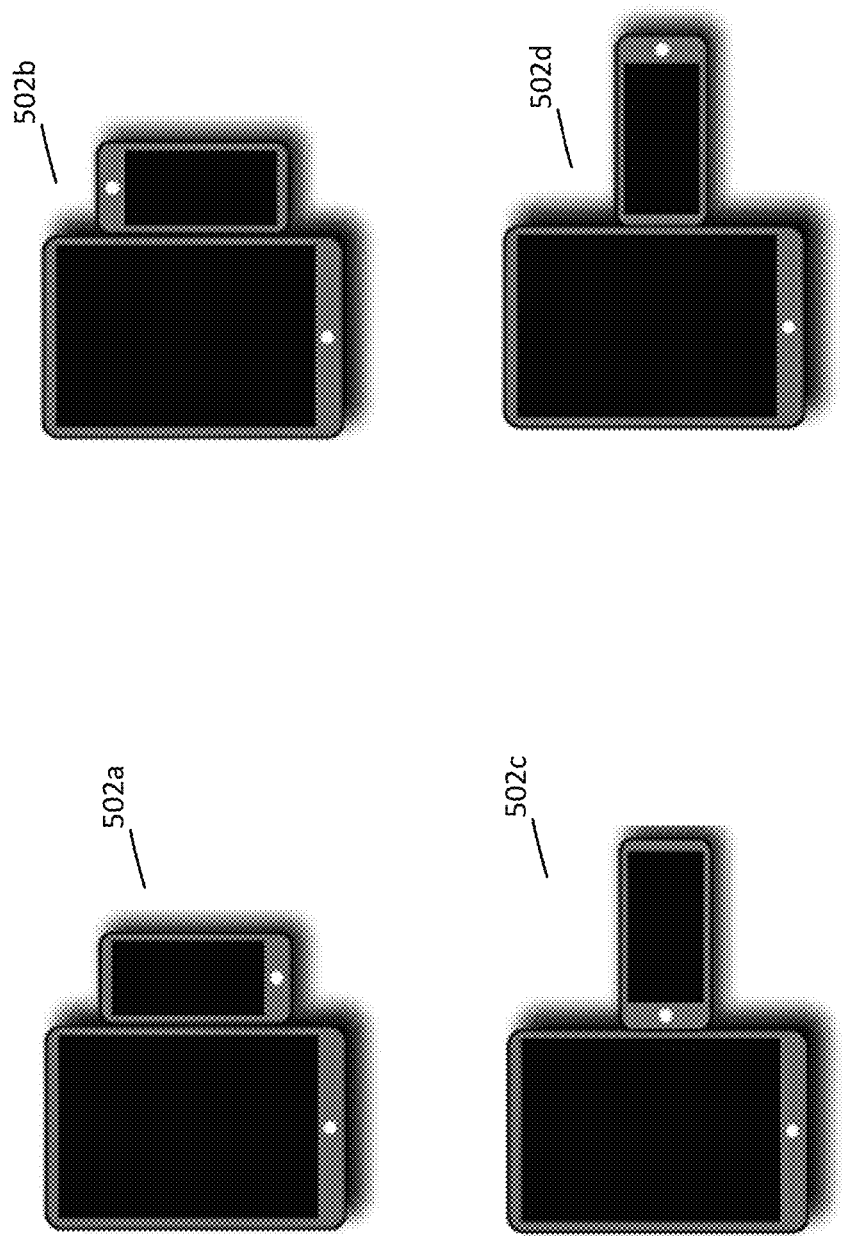
FIG. 5 depicts a schematic diagram illustrating non-limiting examples of adjacent client devices in accordance with some embodiments of the present disclosure.

According to some embodiments, the distance threshold measure of devices 200 and 200a-200n may require devices 200a-200n to be touching device 200 (or having their respective sensors immediately facing one another) as illustrated in FIG. 5 below. This may be required to overcome ambiguities when devices and/or positions (e.g., coordinates) at location 100 have similar BLE (within a distance threshold range) signal strengths. Thus, according to embodiments of the present disclosure, reference to devices being "adjacent" refers to devices satisfying the distance threshold measure, or within an "immediate proximity" (i.e., physically touching and in the same plane (or along the same axis)), which avoids any discrepancies in signal reading, detection and/or observations triggered from differential environmental settings between devices, locations and/or within a location. However, it should be understood that embodiments can exist where the distance threshold measure can be extended beyond devices being in immediate proximity, whereby the distance threshold measure can be based on signals being detected when devices are located at locations of an expanded radius around a detecting device, which can be based on other types of device signals being communicated and/or advances in BLE/RSSI signals analysis and determinations.

According to some embodiments, as discussed in more detail below, device 200 can have functionality related to BLE technology. The mobile device 200 may be a terminal for providing a user with a service via BLE communication with another mobile device 200a, 200b, and ... 200n. For example, the mobile device 200 may register and manage information about the other devices, for example, Identification (ID) information, in a memory.

By way of background, Bluetooth™ technology enables short-range wireless communication, rather than having to use cables to connect devices to each other. That is, for example, when Bluetooth wireless technology is implemented in a cellular phone or a laptop computer, the cellular phone or the laptop computer may be connected to a wireless communication network without having to make a cable connection. All types of digital devices, including smartphones, tablets, phablets, printers, Personal Digital Assistants (PDAs), desktop computers, mobile devices and terminals, wearable devices or clothing, fax machines, keyboards, and joysticks and the like, can be a part of a Bluetooth system. Bluetooth wireless technology can also be used to form an interface between an existing data network and peripheral devices and form a special group between devices which are located far from a fixed network infrastructure. Bluetooth technology provides a robust wireless connection based on quick recognition and by using a frequency hopping method. A Bluetooth module avoids interference with other signals by hopping to a new frequency after the transmission or reception of a packet. Compared to other systems which operate within the same frequency range, the Bluetooth technology uses an especially short and fast packet exchange.

Bluetooth Low Energy (BLE) is a function of the Bluetooth Core Specification Version 4.0 of Bluetooth, which is a short-range wireless communication technology. BLE (also referred to as Bluetooth LE, and marketed as Bluetooth Smart), is a wireless personal area network technology aimed at novel applications in the healthcare, fitness, security, and home entertainment industries, in addition to smart home and proximity detection services. BLE provides considerably reduced power consumption and cost compared to classic Bluetooth, while maintaining a similar communication range. BLE is natively supported by mobile operating systems, including, for example, iOS®, Android®, Windows® Phone and BlackBerry®, as well as OS X, Linux®, and Windows 8®. BLE involves advantages including, but not limited to, low power requirements, operating for "months or years" on a button cell (i.e., a small single cell battery). As discussed herein, BLE has compatibility with a large installed base of mobile phones, tablets and computers.

Additionally, BLE supports "electronic leash" applications, which are well suited for long battery life, "always-on" devices. As understood by those of skill in the art, an electronic leash is the pairing ("leashing") of one or more wireless devices to a host device that allows the user to find misplaced or out-of-sight objects by activating the host device such that the "leashed" object identifies itself. Thus, BLE, via electronic leashing, can allow a single user-operated device to send communications to a large number of devices or objects.

According to some alternative embodiments, the systems and methods discussed herein can be supported by microphone-only devices, such as, for example, smart-watches linked to a mobile device, where the two devices (watch and phone, or other combinations of wearable devices such as glasses or one or more items of intelligent clothing) form one logical unit.

Turning back to FIG. 1, mobile devices 200-200n, according to some embodiments, may be implemented in various forms. For example, mobile devices 200-200n may include virtually any portable computing device capable of connecting to another device and receiving information. Such devices include multi-touch and portable devices such as, but not limited to, cellular phones, smart phones, smart watches, display pagers, radio frequency (RF) devices, infrared (IR) devices, Personal Digital Assistants (PDAs), handheld computers, laptop computers, wearable computers, tablet computers, phablets, navigation devices, e-book terminals, integrated devices combining one or more of the preceding devices, and the like. Mobile devices 200-200n also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 100 may uniquely identify themselves through any of a variety of mechanisms, including a phone number, Mobile Identification Number (MIN), an electronic serial number (ESN), or other mobile device identifier.

In some embodiments, the mobile devices 200-200n may communicate identification information via a BLE communication network. As understood by those of skill in the art, such BLE communication can be coupled to, or implemented via a wireless network.

A Wireless network may include any of a variety of wireless sub-networks that may further overlay stand-alone ad-hoc networks, and the like, to provide an infrastructure-oriented connection for mobile devices 200-200n. Such sub-networks may include mesh networks, Wireless LAN (WLAN) networks, cellular networks, and the like. Wireless network connectivity may further include an autonomous system of terminals, gateways, routers, and the like connected by wireless radio links, and the like. These connectors may be configured to move freely and randomly and organize themselves arbitrarily, such that the topology of the wireless network may change rapidly. BLE communication between devices 200-200n may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile device 200 with various degrees of mobility. For example, a wireless network BLE communication may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, such BLE communication may include virtually any wireless communication mechanism by which information may travel between mobile devices 200-200n.

BLE communication between mobile devices 200-200n at a location 100 can be enabled as a stand-alone network to employ any form of computer readable media for communicating information from one electronic device to another. For security of the information, such information may be secured by using a known or to be known negotiated encryption key or a pre-defined encryption key. Such encryption may occur at the mobile devices 200-200n, or some combination thereof. Within the communications networks utilized or understood to be applicable to the present disclosure, such networks will employ various protocols that are used for communication over the network. Signal packets communicated via a network, such as a network of participating digital communication networks, may be compatible with or compliant with one or more protocols.

Signaling formats or protocols employed may include, for example, TCP/IP, UDP, DECnet, NetBEUI, IPX, APPLE-TALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, each mobile device 200-200n may communicate or broadcast information directly or indirectly to and from each other or among groups of devices. That is, as discussed in more detail below, mobile devices 200-200n may communicate information associated with identification information, signal-strength information and/or location information, in addition to orientation information associated with the device and a gesture performed via the device.

According to some embodiments of the present disclosure, such communication detection is a representation of an ad-hoc network. There is, however, no requirement for an exchange of information between mobile devices 200-200n. In accordance with embodiments of the present disclosure, mobile devices 200-200n simply detect communication signals (e.g., broadcast signals) transmitted from each device 200-200n. There is no requirement for the mobile devices 200-200n to authenticate, connect or exchange data with other devices. Devices 200-200n, through sensors in or on the device, only need to detect signals output from the other devices in order to spatially identify another device. According to some embodiments, detection of the signals communicated or broadcast from mobile devices 200-200n may be detected via BLE communication, as discussed above.

Figure 2:
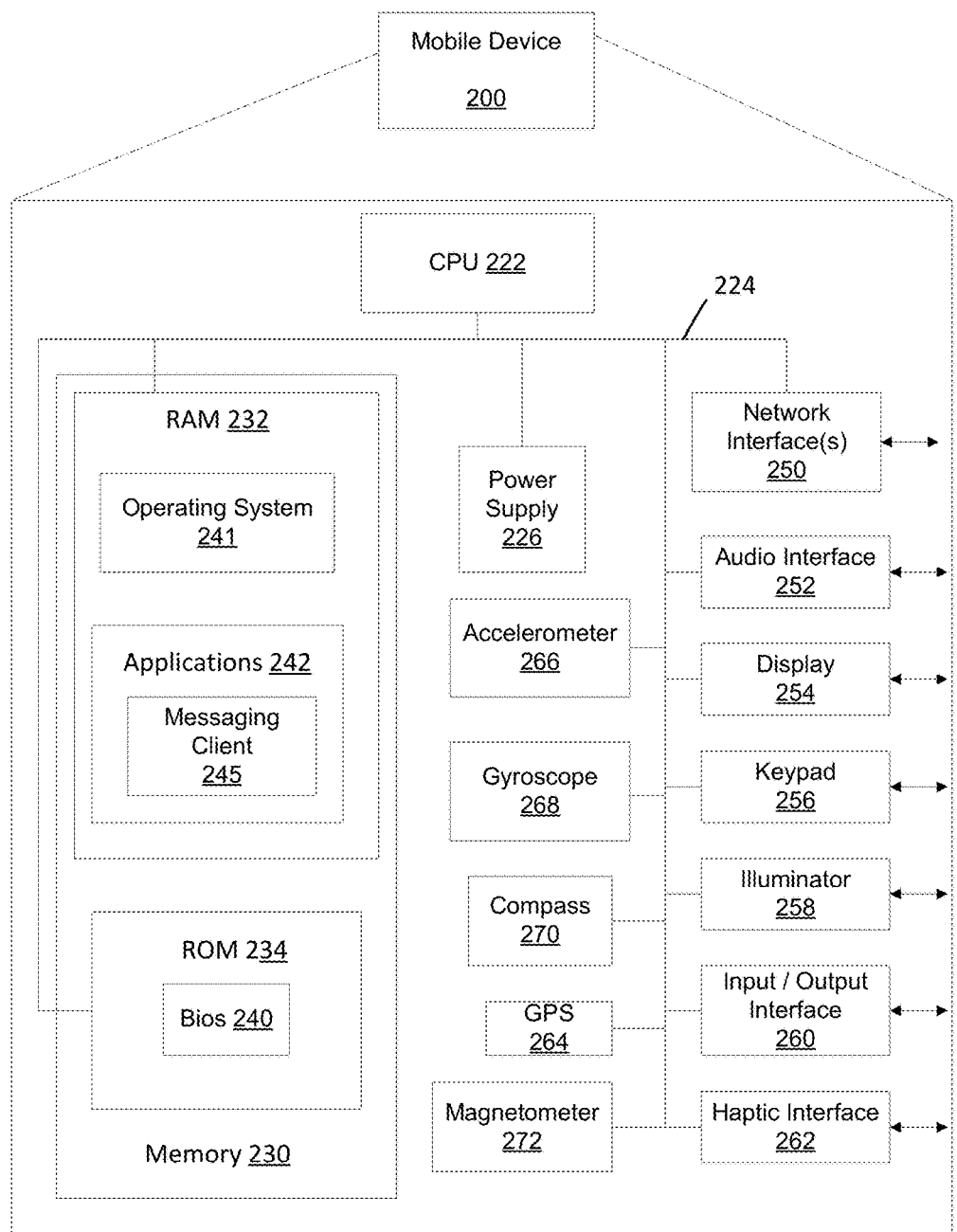
FIG. 2 depicts is a schematic diagram illustrating an example of client device in accordance with some embodiments of the present disclosure.

FIG. 2 is a schematic diagram illustrating an example embodiment of a client device that may be used within the present disclosure. As discussed above, a client device can be any type of mobile or portable device. For purposes of this disclosure, and for clarity of the following discussion, such devices will be referred to as "mobile devices". It should be understood that a mobile device refers to all types of portable devices or accessories (e.g. headsets, keyboards and the like) that support BLE, as discussed above. Mobile device 200 may include many more or less components than those shown in FIG. 2. However, the components shown are sufficient to disclose an illustrative embodiment for implementing the present disclosure. Thus, mobile device 200 may represent, for example, mobile devices 200-200n discussed above in relation to FIG. 1.

As shown in FIG. 2, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264 and a camera(s) or other optical, thermal or electromagnetic sensors. Power supply 226 provides power to Mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling Mobile device 200 to one or more networks, and is constructed for use with one or more communication protocols and technologies as discussed above. Network interface(s) 250 represent, one or more receivers, antennas, transmitters, transceivers, transceiving devices, or network interface cards or modules (NIC) and associated antennae for various communication techniques, media and protocols.

Audio interface 252 is arranged to produce and receive audio signals such as the sound of a human voice or audio tones or signals. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED or OLED), or any other type of display used with a computing or mobile device. Display 254 may also include a touch sensitive screen arranged to receive input from an object such as a stylus or a digit or gestures from a human hand.

Keypad 256 may comprise any input device arranged to receive input from a user. For example, keypad 256 may include a push button numeric dial, or a keyboard. Keypad 256 may also include command buttons that are associated with selecting and sending information (or content) over a network to other devices for purposes of identifying the sending device and/or locating a receiving device (or mapping a location), as discussed in more detail below. Illuminator 258 may provide a status indication and/or provide light. Illuminator 258 may remain active for specific periods of time or in response to events. For example, when illuminator 258 is active, it may backlight the buttons on keypad 256 and stay on while the mobile device is powered. Also, illuminator 258 may backlight these buttons in various patterns when particular actions are performed, such as dialing another mobile device. Illuminator 258 may also cause light sources positioned within a transparent or translucent case of the mobile device to illuminate in response to actions.

Mobile device 200 also comprises input/output interface (s) and associated antennae 260 for communicating with external devices, such as a BLE device/unit 100 (from FIG. 1) or a headset, or other input or output devices not shown in FIG. 2. Input/output interface 260 can utilize one or more communication technologies, such as USB, infrared, Bluetooth™, BLE, or the like. Interface 260 may include one or more units for communication between the mobile device 200 and the BLE device 100, or between the mobile device 200 and a server. For example, Interface 260 may include a BLE communication unit, a mobile communication unit, and a broadcasting receiving unit. The BLE communication unit supports a BLE communication function. The BLE communication unit may scan the BLE device 100 for a predetermined period of time or upon a request from a user. The BLE communication unit may involve a sensor hub. As understood by those of skill in the art, the sensor hub is a type of Micro Controller Unit (MCU) and may be connected to various types of sensors. The sensor hub, according to some embodiments can collect information about the external BLE device 100.

The communication unit of interface(s) 260 may also support other short-range wireless communication functions, in addition to the BLE communication function. Short-range wireless technology may include, but is not limited to, a wireless Local Area Network (LAN) which could be a Wi-Fi, Bluetooth, WiFi direct (WFD), Near Field Communication (NFC), Ultra WideBand (UWB), or Infrared Data Association (IrDA) network, as discussed above with respect to BLE communication. The mobile communication unit of interface 260 transmits and receives a wireless signal to and from with at least one of a base station, an external terminal, and a server on a mobile communication network. The wireless signals may include, for example, a voice call signal, a video phone call signal or various forms of data used to transmit and receive text or multimedia messages. The broadcasting receiving unit of interface 260 receives broadcasting signals and/or broadcasting-related information from outside, via a broadcasting channel. The broadcasting channel may include, but is not limited to, a satellite channel and a terrestrial broadcast channel.

Haptic interface 262 is arranged to provide tactile feedback to a user of the mobile device. For example, the haptic interface may be employed to vibrate mobile device 200 in a particular way when the Mobile device 200 receives a communication from another user.

Optional GPS transceiver 264 can determine the physical coordinates of Mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Mobile device 200 on the surface of the Earth. It is understood that under different conditions, GPS transceiver 264 can determine a physical location within millimeters for Mobile device 200; and in other cases, the determined physical location may be less precise, such as within a meter or significantly greater distances. In one embodiment, however, Mobile device 200 may through other components, provide other information that may be employed to determine a physical location of the device, including for example, a MAC address, IP address, or the like. The device 200 can also determine the physical location, orientation, coordinates, directional movement or positioning, and the like via, for example, accelerometers 266, one or more gyroscopes 268, a compass 270, one or more magnetometers 272, and the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Mobile device 200. The mass memory also stores an operating system 241 for controlling the operation of Mobile device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Mobile device 200 to store, among other things, applications 242 and/or other data. For example, data stores may be employed to store information that describes various capabilities of Mobile device 200. The information may then be provided to another device based on any of a variety of events, including being sent as part of a header during a communication, sent upon request, or the like. At least a portion of the capability information may also be stored on a disk drive or other storage medium (not shown) within Mobile device 300.

Applications 242 may include computer executable instructions which, when executed by Mobile device 200, transmit, receive, and/or otherwise process audio, video, images, and enable telecommunication with another user of another mobile device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described with respect to FIGS. 3-6.

Figure 3:
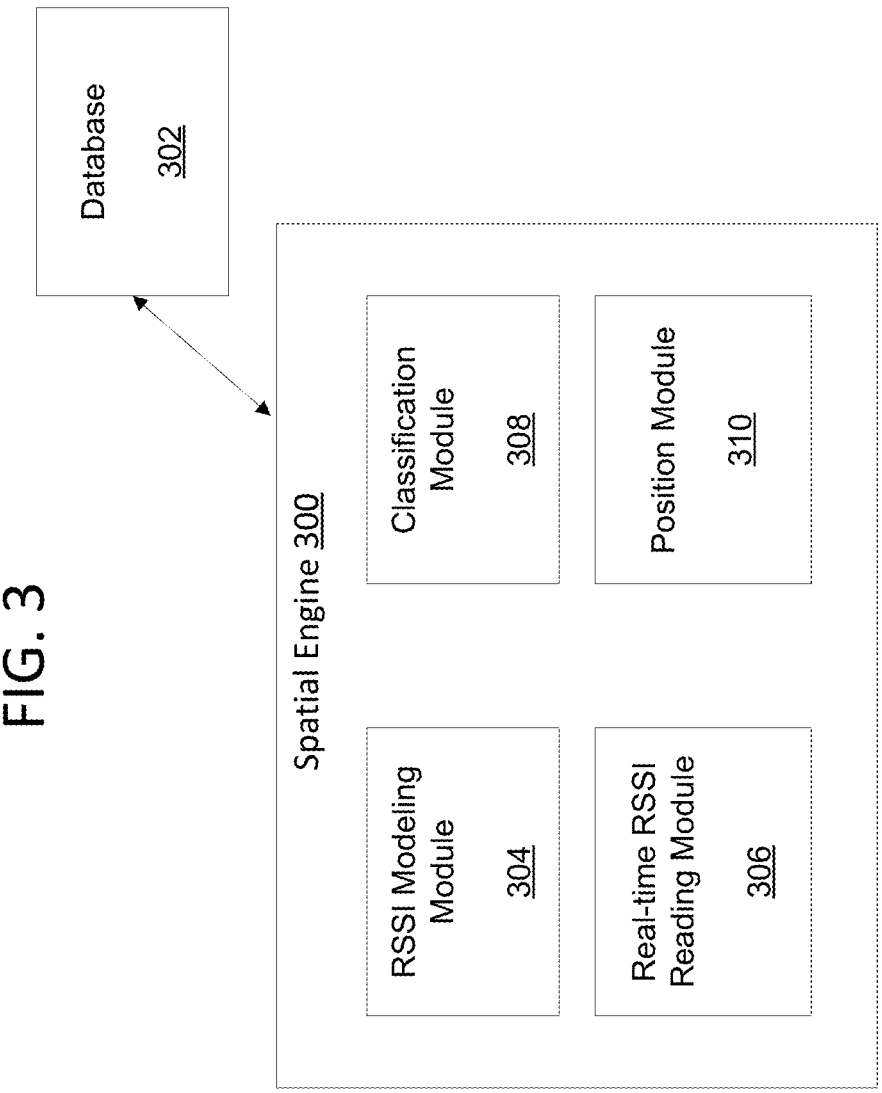
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a spatial engine 300 and an associated database 302 for storing spatial tracking information. The spatial engine 300 can be a special purpose machine or processor and could be hosted by a mobile device 200-200*n*, a separate BLE device(s) at location 100, a server, content provider, an ad server, and the like, or any combination thereof. According to embodiments of the present disclosure, the spatial engine 300 can be implemented via an installed or web-based application that executes on a mobile device 200-200*n*.

As discussed in more detail below, spatial context information can be detected or provided to the spatial engine 300 or accessed by a computer program or device that can access the information. Such information, as discussed in more detail below, relates to determined locations of mobile devices respective to other devices at a location, distances associated between mobile devices at a location, distances between mobile devices and other BLE devices (or units) at a location, a mobile device's signal strength and the mobile device's identifier, orientation of the device, and the like. Indeed, the spatial information can include a type of mobile device, a user associated with the device, proximity data or location data associated with the mobile device, number of mobile devices within a proximity or associated with a location, among other types of information.

In some embodiments, the spatial information can be stored in a data structure in storage (e.g., a lookup table and/or other relational data format or structure) in database 302. The database 302 can be any type of database or memory that can store the information mentioned above, inter alia. The database 302 can be associated with a device, user, user account, service provider, location, or a network, or some combination thereof.

The principal processor, server, or combination of devices that comprises hardware programmed in accordance with the special purpose functions discussed herein is referred to for convenience as the spatial engine 300. The spatial engine 300 includes a RSSI modeling module 304, a real-time RSSI reading module 306, a classification module 308 and a position module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIGS. 4-6.

Figure 4:
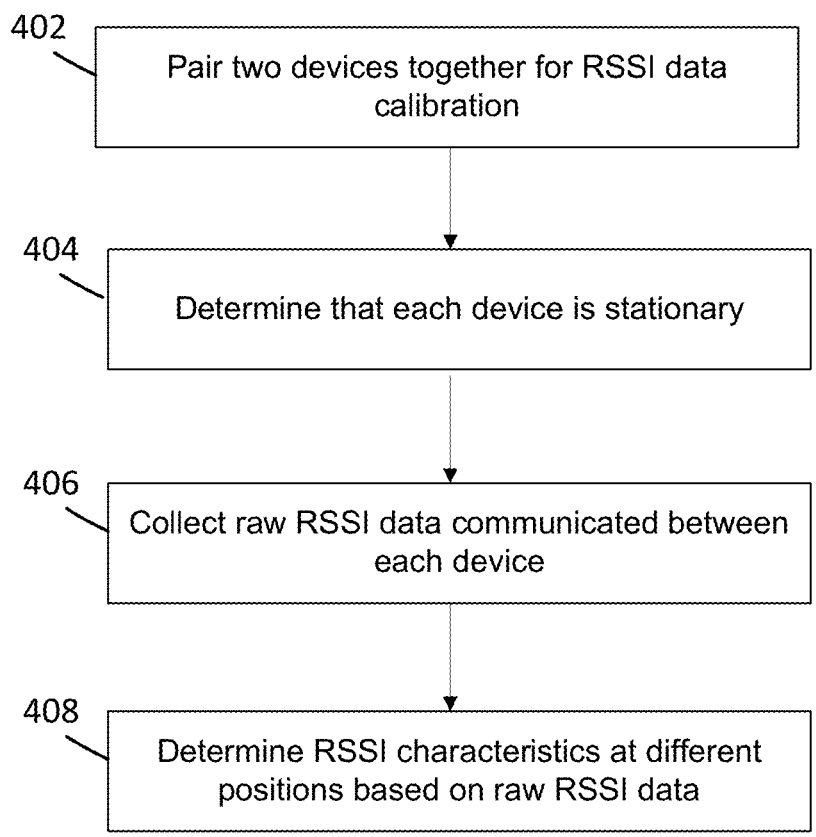
FIG. 4 is a flowchart illustrating steps performed in accordance with some embodiments of the present disclosure.

Turning now to FIG. 4, Process 400 discloses how the spatial engine 300 determines or models RSSI distributions for a device via the RSSI modeling module 304. Such modeling is utilized as a basis for Process 600 discussed below, which involves leveraging the asymmetric radio frequency field pattern of the device to locate other adjacent devices according to some embodiments of the present disclosure.

As discussed above, the asymmetry of a device occurs from the properties of the device's antenna. According to some embodiments, such properties can include, but are not limited to, the off-center placement of the device's antenna, the antenna's design, the antenna's material (e.g., what the antenna is composed of), the shielding properties of the antenna and/or associated device, and the like. Therefore, understanding such device properties, Process 400 can map the RSSI distributions around the device.

Process 400 begins with Step 402 where two devices are paired together to perform modeling (also referred to as calibration) of RSSI data. For purposes of this discussion, the devices will be referred to as a first device and a second device, where the first device is the device being calibrated. For example, the first device can be an iPad® and the second device can be an iPhone®. According to some embodiments, more than two devices may be used (as illustrated in FIG. 1); however, for purposes of this disclosure, two devices will be referenced herein for simplicity of explanation and without limiting the scope of the instant disclosure.

In Step 404, a determination is performed regarding whether the devices are physically stationary. Such determination is based on obtaining the accelerometer data for each device. If the accelerometer data for each device satisfies a movement threshold, then Process 400 can continue on to the RSSI collection process and orientation data exchange obtained by the magnetometer of each device through BLE as in Step 406.

In some embodiments, Process 400 may be performed without performing Step 404. That is, Process 400 can include the spatial engine 300 identifying and measuring a device's movement ambiguity, which is measured by a device's accelerometer or gyroscope data. The accelerometer data includes 1) data indicating how much a device is moving (or has moved); and 2) the direction of such movement (or how a device's orientation has changed). Such data can be utilized as an offset of deviation from the calibration and modeling discussed herein when it is above the movement threshold.

In Step 406, if the devices are determined to be stationary, raw RSSI data being communicated between each device is collected and stored in database 302. According to some embodiments, the collection of raw RSSI data can be based on any known or to be known techniques of BLE or near-field equipment of such devices performing radio broadcasting and/or scanning. As understood by those of skill in the art, such broadcasting/scanning includes data associated with the power (or strength) upon which a device' antenna broadcasts a beacon (or series of beacons). Such beacon strength can be set by the device owner, or be factory-calibrated (e.g., by the parts manufacturer, device manufacturer, and the like), creator of software running on the device, or any other part or component combination (e.g., hardware and software) for communicating the beacon (e.g., the BLE signal), and the like. Such beacon strength typically ranges between −30 dBm and +4 dBm (lowest to highest power, respectively). As understood by those of skill in the art, the higher the power, the bigger the beacon's range and the more stable the signal, but it also shortens the frequency (or intervals) of the beacon.

According to some embodiments, the RSSI signals communicated from each device are aggregated for sampling and collection purposes. That is, the RSSI signals can be aggregated according to a respective signal threshold, whereby signals at or above the threshold are detected and collected. For example, the signal threshold can be at 45 Hz, whereby signals communicated at or over the threshold are collected for further analysis (as in Step 406 below).

Step 406 involves collecting the raw RSSI data around the first device. In some embodiments, raw RSSI data can be scanned for and collected around the first device at predetermined positions around the first device. The raw RSSI data can include information indicating the location of devices around the first device and orientation of such devices. The orientation information can be determined from the RSSI data and/or detected by a magnetometer of the first device, for example. As discussed below and in reference to FIG. 5, the second device can be positioned around the first device in different orientations for a RSSI data exchange, collection and measurement, as well as orientation data analysis (e.g., magnetometer data, which can be detected from a device's BLE signal and/or communicated as part of the BLE signal).

According to some embodiments, in order to overcome similar signal strength ambiguities between adjacently placed devices, as discussed above in reference to FIG. 1, Step 406 focuses on locations around the first device where the second device is in "immediate proximity" to the first device. Immediate proximity generally refers to devices being in the same plane and physically touching, or otherwise in detectable proximity in accordance with the embodiments described herein. In some embodiments, RSSI data is collected for a predetermined number of positions and orientations along all (or at least one of the) four edges of the first device, whereby the spacing around any two points on the same side of the first device are evenly distributed. For each position, the adjacent device (or second device) is mapped four times, where each time a different orientation is utilized, and therefore a different edge is touching (as illustrated in FIG. 5 discussed below).

By way of a non-limiting example, as illustrated in FIG. 5, utilizing an iPad® as the first device and an iPhone® as the second device (from the discussion immediately above, by way of non-limiting example, although any mobile device may be interchanged for the devices depicted in in the current example). FIG. 5 illustrates the display of the iPhone on the right edge of the iPad in all four orientations. Such orientations include: 502a—where the iPhone's left edge is in immediate proximity to the right edge of the iPad; 502b—where the iPhone is inverted and the phone's right edge is in immediate proximity to the right edge of the iPad; 502c—where the iPhone is turned 90 degrees clockwise from an upright position so that its bottom edge is in immediate proximity to the right edge of the iPad; and 502d—where the iPhone is turned 270 degrees clockwise (or 90 degrees counter-clockwise) from an upright position so that its top edge is in immediate proximity to the right edge of the iPad.

It should be understood that orientation combinations illustrated in 502a-504b can be performed for each edge of the first device (e.g., the top, bottom, left and right sides the iPad). Additionally, as discussed above, RSSI data is collected for a predetermined number of positions along the four edges of the first device, whereby the spacing around any two points on the same side of a device are evenly distributed. By way of a non-limiting example, the predetermined number of positions can include 16 positions along the four edges of the iPad, where there are 5 positions on each width side (right and left edges) and 3 positions on each height side (top and bottom edges).

Step 408 involves determining RSSI characteristics between the device pair at different positions based on the collected raw RSSI data (from Step 406). The "different"

positions of Step 408 are those positions utilized in Step 406 in collecting the raw RSSI data. Thus, Step 408 results in a device pair modeling, whereby a device's asymmetry is mapped 360 degrees around the device for purposes of spatial sensing of other devices in the device's RSSI distribution field (e.g., BLE broadcast). This 360 degree position mapping is discussed above in relation to Step 406 and FIG. 5, where the positions around the device can be along all four edges of the device, and/or combinations of edges (e.g., along a corner), and/or in any orientation.

According to some embodiments, Step 408 involves utilizing a discrete RSSI probability distribution to represent the raw RSSI data from each position. It should be understood that any known or to be known probabilistic modeling can be applied herein. For example, given a specific position and configuration of devices (e.g., position and orientation of the second device around the first device as illustrated in FIG. 5), Step 408 can involve performing the following probability determination of RSSI characteristics:

$$P(x|x) = \text{count}(x)/\text{totalcount} \qquad (1),$$

where P (x|c) denotes the probability that specific RSSI "x" happens at position "x"; "count x" denotes the count of RSSI "x" in the data collection at position "c"; "totalcount" is the total count of the RSSI samples recorded at that position. The RSSI characteristics (i.e., modeling of the first, second, and/or first and second device) for each location and orientation is then stored as spatial context information in database 302. That is, as discussed above, the RSSI distributions for each of the four orientations of the second device relative to the first device have been collected (and stored in database 302). As such, according to some embodiments, Step 408 can result in the creation, maintaining and updating of four separate models per side of the first device, one for each orientation.

According to some embodiments of the present disclosure, the mapping and/or calibration of paired devices as discussed above in relation to Process 400 and below in relation to Process 600 can involve iterative or recursive bootstrapping or aggregation functionality, whereby the results of such Processes can be fed back to the spatial engine 300 for further modeling (or training as in Process 400) to improve the accuracy of the RSSI calibration. Embodiments of the present disclosure involve the spatial engine 300 applying such recursive/bootstrapping functions utilizing any known or to be known open source and/or commercial software machine learning algorithm, technique or technology.

Figure 6:
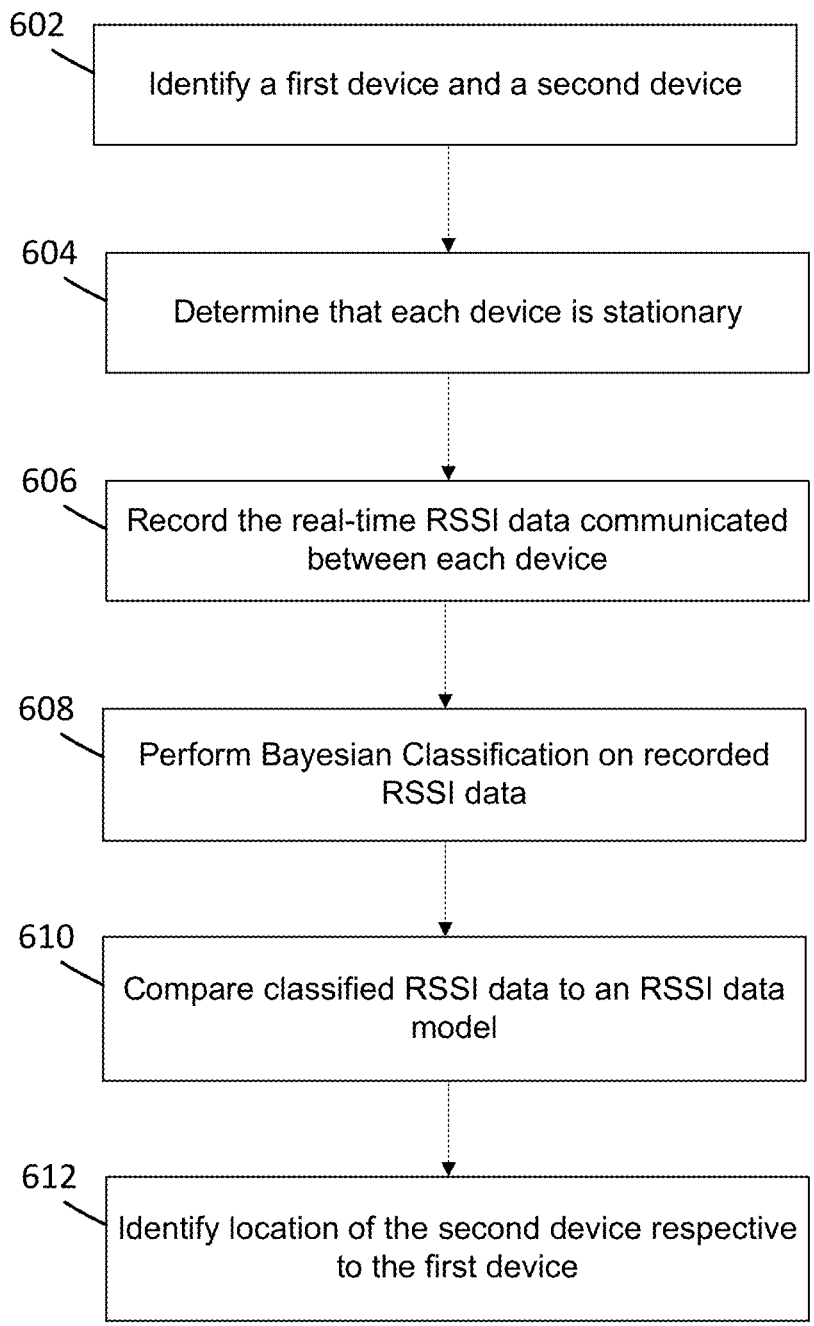
FIG. 6 is a flowchart illustrating steps performed in accordance with some embodiments of the present disclosure.

Turning now to FIG. 6, Process 600 details an example flowchart illustrating steps performed in accordance with exemplary embodiments of the present disclosure for performing spatial sensing in order to determine and locate adjacent devices at a location. Process 600 provides an exemplary application of the modeled spatial engine 300 (as discussed above in Process 400) for performing spatial sensing via asymmetric Bluetooth Low Energy (BLE) received signal strength indication (RSSI) distributions. As discussed herein, Process 600 performs measurements in real-time (or near real-time) of BLE signal strength sequences communicated between adjacent devices, and compares the measurements to the modeled RSSI distributions. Based on such comparisons, the spatial engine 300 is able to determine the relative positions of adjacent devices. Once the positions are identified, the devices are then able to communicate, whereby such communications can be effectively viewed as adjacent devices being wirelessly tethered together, and/or forming a wireless connected pair for purposes of sharing, generating and/or consuming content/media.

Process 600 begins with Step 602 where two devices are identified. In a similar manner as discussed above in relation to Process 400, for purposes of this discussion, the devices will be referred to as a first device and a second device solely for reference purposes (or for distinguishing between different devices) and not in line with any designation of priority, importance or ranking. For example, the first device can be an iPad® and the second device can be an iPhone®. According to some embodiments, more than two devices may be used (as illustrated in FIG. 1); however, for purposes of this disclosure, two devices will be referenced herein for simplicity of explanation and without limiting the scope of the instant disclosure.

In Step 604, a determination is made as to whether each device is physically stationary. Such determination is performed in a similar manner as discussed above in relation to Step 404. The determination in Step 604 is based on obtaining the accelerometer data for each device. If the accelerometer data for each 302 device satisfies a movement threshold, then Process 600 can continue on to the RSSI collection process and orientation data exchange obtained by the magnetometer of each device through BLE as in Step 606.

In some embodiments, Process 600 can be performed without performing Steps 604's stationary determination in a similar manner as discussed above in relation to Step 404. That is, Process 600 can include the spatial engine 300 detecting and measuring a device's movement ambiguity through the device's accelerometer or other motion sensing data. The accelerometer or motion data includes 1) data indicating how fast or slow a device is moving over some distance (or has moved); and/or 2) the direction of such movement; and/or 3) how a device's orientation has changed. Such data can be utilized as an offset of recorded data in Step 606 discussed below when it is above a movement threshold.

In Step 606 the real-time RSSI data communicated by each device is recorded and stored as spatial context information in database 302 (as discussed above). In some embodiments, Step 606 may only be performed if the devices are determined to be stationary; and in some embodiments, the recorded data can have an offset applied according to the detected movement, as discussed above.

According to some embodiments, the RSSI data recorded is only the data communicated between each device. In some embodiments, the RSSI data recorded is the BLE signals broadcast by each device during Step 606. Step 606, which involves recording the beacon strength of each broadcasting/communicating device in a similar manner as that performed in Step 406, is performed by the RSSI reading module 306.

In some embodiments, Step 606 can involve determining the second device's orientation around the first device. That is, using the illustrations 502a-502d from FIG. 5, the RSSI data can indicate the manner in which the second device is situated around the first device. This information can be utilized to determine which of the four separate orientation models per side of the first device (from Process 400) to utilized in Step 610 below.

In Step 608, a Bayesian classification is performed on the recorded RSSI data (from Step 606). Step 608 is performed by the classification module 308. For purposes of this disclosure, the Step 608 references a Bayesian classification; however, it should not be construed as limiting, as any known or to be known Bayes classifier, other machine learning classifier or probabilistic modeling can be used.

According to some embodiments, Step 608 involves processing (or converting or translating) the RSSI data into segments of k frames from first device and second device, and executing a Bayesian classification over each segment. Such processing yields a probability score for each modeled position (from Step 408 above). The RSSI reading module 306 then empirically sets the k value to a predetermined number in order to determine a position of the devices according to a predetermined time period. For example, a predetermined segment value of k can be set at 40 resulting in a device position recordation every second.

Step 608 then involves estimating positioning of each device (e.g., the first device and the relative location of the second device to the first device). The estimation process can be formulated as follows:

$$C = \{c_1, c_2, \ldots, c_n\}, \quad (2)$$

wherein n=a predetermined number of modeled positions around the first device (e.g., 16 positions, in a similar manner as discussed above in relation to Step 406).

For example, given an RSSI sequence from the second device $X = \{x_1, x_2, \ldots, x_n\}$ and an RSSI sequence from the first device $Y = \{y_1, y_2, \ldots, y_n\}$, the conditional probability that [X, Y] is recorded at c is P(c|X, Y). According to some embodiments, the classification occurring in Step 608 involves determining that the recording position is equivalent to finding c* that maximizes P(c|X, Y):

$$c^* = \underset{t}{\mathrm{argmax}} P(c \mid X, Y). \quad (3)$$

Thus, P(c|X, Y) can be formulated as:

$$P(c \mid X, Y) = \frac{P(X, Y \mid c) P(c)}{P(X, Y)}, \quad (4)$$

where P (c) denotes the prior probability of selecting c prior to (or without) the observation of the RSSI reading from Step 606; P (X, Y|c) is the probability function, which expresses how probable the two sequences can be seen at position c, and P (X, Y) is the normalization constant. In some embodiments, P (X, Y) can be a constant, which results in c*:

$$c^* = \underset{t}{\mathrm{argmax}} P(c \mid X, Y) = \underset{t}{\mathrm{argmax}} P(X, Y \mid c) P(c). \quad (5)$$

Each RSSI reading in the sequence [X, Y] is treated as an independent reading; therefore, the likelihood function P (X, Y|c) can be interpreted as the production of the possibility that every single RSSI $x_m$, $y_m$ occurs at position c:

$$P(X, Y \mid c) \sim \log\left(\prod_{m=0}^{k} P(x_m \mid c) * \prod_{m=0}^{k} P(y_m \mid c)\right), \quad (6)$$

which utilizes a logarithm convert score for a linear distribution; where $P(x_m|c)$, $P(y_m|c)$ denotes the probability that specific RSSI value occurs at position c. According to some embodiments, when Process 600 is initiated, P (c) is evenly distributed because there is no prior information. However, as a result of Steps 602-608 (and in some embodiments, also Steps 610-612 as discussed below), P (c) is determined.

According to some embodiments, Step 608 involves a refinement determination to determine the orientation of the second device to the first device. That is, for example, whether the second device is on the long side (i.e., left or right edge) or short side (e.g., top or bottom edge) of the first device. Such determination can be performed to remedy/mitigate ambiguities occurring when a second device may be positioned adjacent to (or within a distance threshold) to a corner of the first device. Step 608's refinement determines if the adjacent side of the first device is the long or short side through use of the on-board accelerometer of the second device. That is, accelerometer data of second device (via user/device movement) is captured and analyzed to identify whether the second device's movement is occurring along an x- or y-axis of the second device. For example, when the second device's orientation to the first device is 90 degrees (as illustrated in item 502c-d of FIG. 5, thereby moving along the second device's x-axis), the second device's movement can be determined to be along one of the two long sides of the first device. In another example, as illustrated in items 502a-b of FIG. 5, if the second device moves along its own top/down direction (e.g., y-axis of the second device), it can be determined that the second device is along one of the two short sides of the first device. Such information can be utilized to update P(c) in the Bayesian model discussed above.

In Step 610, the classified RSSI data (which was recorded in Step 606 and run through a Bayesian Classifier in Step 608) is compared against the modeled RSSI data (from Process 400). Step 610 is performed by the classification module 308. As discussed above, according to some embodiments, the modeled RSSI data of the first device can be selected from one of the determined and separate RSSI models of the first device (as discussed in Process 400 above). For example, if the second device is situated with respect to the first device in a similar manner as illustrated in position 502a (from FIG. 5), then the determined modeling from Process 400 associated with position 502a will be utilized for Step 610.

According to some embodiments, such comparison can be performed by any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like.

By way of a non-limiting example of the comparison Step 610, according to some embodiments, the classified RSSI data and the modeled RSSI data can be translated into respective feature vectors having dimensional values proportional to the amount of segments in each RSSI sequence. These vectors are then compared and the comparison result is compared against a similarity threshold.

According to some embodiments, as in Step 612, if the similarity of data points of each vector is at or above the similarity threshold, then the position module 310 of the spatial engine can determine the second device's location with respect to the first device. Satisfaction of the similarity threshold evidences that the second device is in immediate proximity to the first device (i.e., in the same plane and physically touching) and/or is not out of BLE range or associated with a device's edge or side, or other unknown orientation where the communication sensors of the devices are not aligned. This, therefore, enables the first and second device to communicate, as discussed above. Indeed, the first and second devices can be viewed as two localized and connected devices, whereby they can share the same screen, and/or perform any other type of known or to be known functionality associated with connected pair devices.

While this discussion uses vector analysis as an example, it should be understood that the comparison in Step 610 can be based on any type of known or to be known comparison or data mining algorithm.

Step 612's identification of the second device's position around the first device comprises position information derived from the RSSI data similar to the spatial context information. For example, the position information, which can be communicated to the first device (via a BLE signal or other type of communication message providing an indication of the second device's location for subsequent communication between the two devices) can comprise data indicating, but not limited to, the second device's: orientation, coordinates, direction, and/or any other type of location/positional information respective to the first device and/or a location (e.g., location 100) indicating the second device' peripheral positioning to the first device.

In some embodiments, the classified RSSI data that satisfies the similarity threshold may be subject to a position interpolation, performed by the position module 310. The position interpolation discussed herein ensures that the determined position of the second device respective to the first device is refined because situations may arise where the second device is not located at, or associated with an exact modeled position. Such situation may include when a device is in between modeled positions. In some embodiments, Step 612 can include refining the classified RSSI data by performing a linear interpolation of such data to identify adjacent positions that may coincide with a modeled location:

$$c_{final} = \frac{c^* * P(X \mid c^*) + c_{interpolate} * P(X \mid c_{interpolate})}{P(X \mid c^*) + P(X \mid c_{interpolate})}. \qquad (7)$$

where $c^*$ is the position with the strongest RSSI connection (from Process 400); $c_{interpolate}$ is the adjacent point to $c^*$. Therefore, a result of the interpolation can have the second device's location (identified in Step 612) be associated with (or translated to) the location/RSSI data associated with the $c_{interpolate}$ result. In some embodiments, the interpolation discussed herein can also reveal the device's orientation as the determined location. While the discussion herein focuses on linear interpolation, it should not be construed as limiting, as any known or to be known type of interpolation, whether linear, non-linear, polynomial or spline interpolation and the like, can be utilized herein without departing from the scope of the instant disclosure.

Therefore, Process 600, which utilized asymmetry of two device's BLE RSSI distributions, results in the determination of the relative location of two proximate devices: the location of the second device respective to the first device. Indeed, while the discussion above utilized an iPad® and an iPhone® as the device examples, the disclosed systems and methods can be performed on any known or to be known commodity device that is BLE enabled. This determination, as discussed above, enables the first and second device to communicate, share and/or exchange data in real-time for purposes of consuming, creating, and/or processing digital information. Indeed, the identified locations of the first and second devices respective to each other can enable such devices to establish a connection between each other thereby leading them to be viewed as two localized and connected devices, whereby they can share the same screen, and/or perform any other type of known or to be known functionality associated with connected pair devices.

Figure 7:
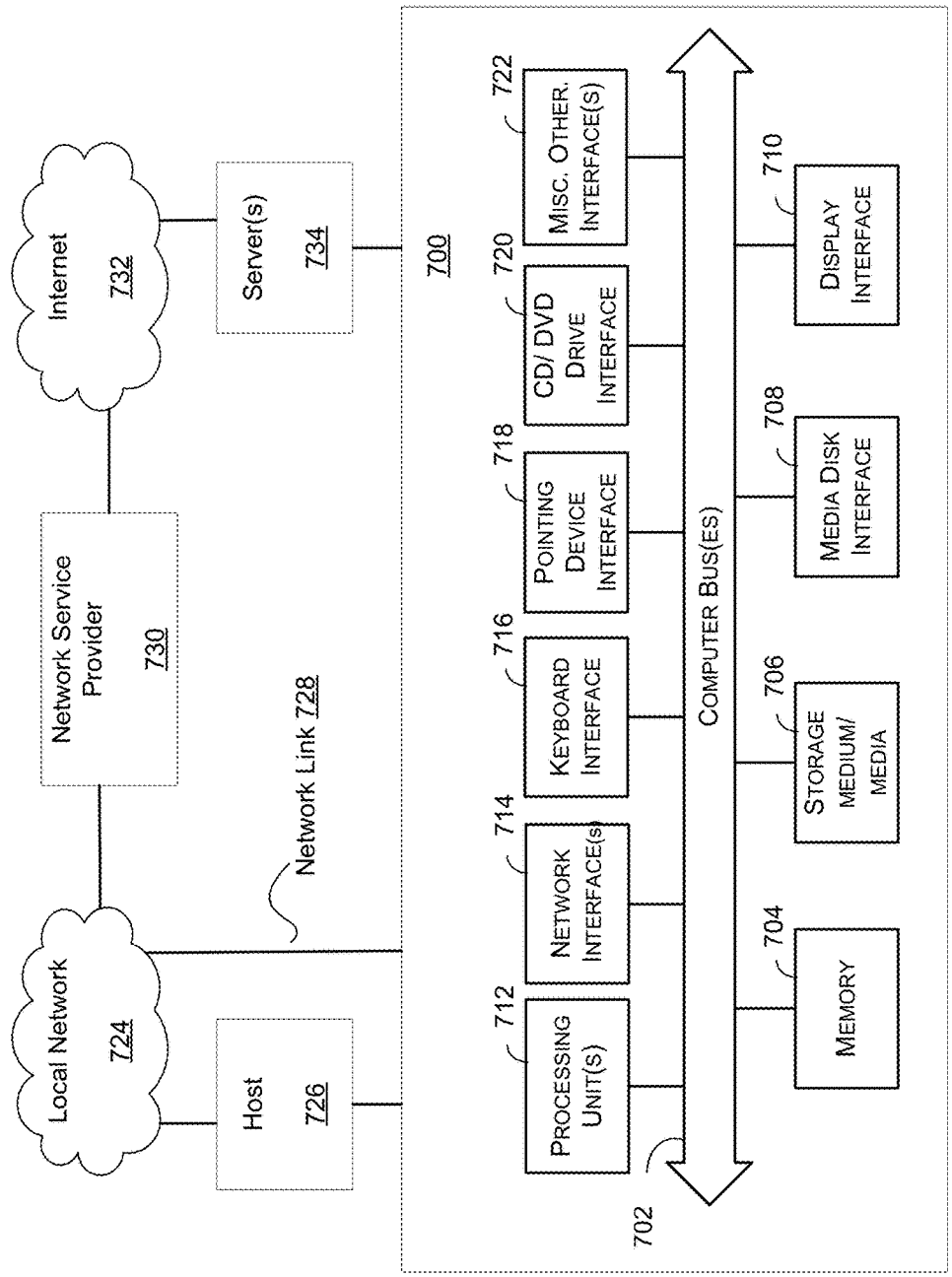
FIG. 7 is a block diagram illustrating architecture of an exemplary hardware device in accordance with one or more embodiments of the present disclosure.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, via a first computing device, a second device at a location;
   recording, via the first computing device, received signal strength indication (RSSI) data communicated between the first and second devices, the RSSI data comprising information associated with Bluetooth Low Energy (BLE) signals exchanged between the first device and the second device;
   comparing, via the first computing device, the recorded RSSI data against a RSSI data model associated with the first computing device, said comparison of the recorded RSSI data and the RSSI data model performed in accordance with a similarity threshold;
   determining, via the first computing device, a position of the second device with respect to the first device based on said comparison, said position determination occurring upon the recorded and modeled RSSI data comparison satisfying the similarity threshold;
   determining, via the first computing device, an orientation of the second device from the recorded RSSI data, said orientation comprising information indicating how the second device is situated within a plane occupied by the first device, said orientation information indicating which edge of the second device is facing the first device; and
   forming, via the first computing device based on the position and orientation determinations, a logical unit comprising the first computing device and second computing device, wherein said first computing device and said second computing device are enabled to process information as a connected pair of devices.

2. The method of claim 1, wherein said determined position of the second device utilized in forming said logical unit comprises said orientation information.

3. The method of claim 1, wherein said modeled RSSI data is selected from a set of RSSI data models based on the determined orientation of the second device, each RSSI data model in the set corresponding to an edge of the first device and orientation of another device along said edge.

4. The method of claim 1, further comprising:
determining that said second device is located at a distance from said first device satisfying a distance threshold.

5. The method of claim 1, further comprising:
receiving accelerometer data of the second computing device; and
determining whether said second device is stationary, said determination comprising comparing said second accelerometer data against a movement threshold.

6. The method of claim 5, further comprising:
determining an offset based on the second accelerometer data when said second device is determined to not be stationary; and
applying the offset to the recorded RSSI data of the second device.

7. The method of claim 1, further comprising:
analyzing accelerometer data of the first computing device; and
determining whether said first device is stationary, said determination comprising comparing said first accelerometer data against a movement threshold.

8. The method of claim 1, wherein said RSSI data is based on signal strength of the communicated BLE signals, wherein the BLE signals produce an asymmetric radio frequency field around each device, wherein each asymmetric radio frequency field is resultant an off-set placement of an antenna on each device.

9. The method of claim 1, wherein said comparison comprises:
classifying the recorded RSSI data, said classification comprising determining a probability that the recorded RSSI data occurs at said position, wherein said position determination is based on said probability determination; and
comparing said classified recorded RSSI data to said RSSI data model.

10. The method of claim 1, further comprising:
interpolating said recorded RSSI data to modeled position around the first device having an RSSI data model, said modeled position being adjacent to said determined position.

11. The method of claim 3, wherein said set of RSSI models is based on RSSI characteristics of the first device, said characteristics based on a probability analysis, for each edge of the first device, comprising:

$$P(x|c)=\text{count}(x)/\text{totalcount},$$

wherein P (x|c) denotes a probability that a specific RSSI x happens at position x around the first device;
wherein count x denotes a count of said RSSI x in the RSSI data collection at position c around the first device; and
wherein totalcount is a total count of said RSSI data recorded at position x.

12. A non-transitory computer-readable storage medium tangibly encoded with computer-executable instructions, that when executed by a processor associated with a first computing device, performs a method comprising:
identifying a second device at a location;
recording received signal strength indication (RSSI) data communicated between the first and second devices, the RSSI data comprising information associated with Bluetooth Low Energy (BLE) signals exchanged between the first device and the second device;
comparing the recorded RSSI data against a RSSI data model associated with the first computing device, said comparison of the recorded RSSI data and the RSSI data model performed in accordance with a similarity threshold;
determining a position of the second device with respect to the first device based on said comparison, said position determination occurring upon the recorded and modeled RSSI data comparison satisfying the similarity threshold;
determining an orientation of the second device from the recorded RSSI data, said orientation comprising information indicating how the second device is situated within a plane occupied by the first device, said orientation information indicating which edge of the second device is facing the first device; and
forming, based on the position and orientation determinations, a logical unit comprising the first computing device and second computing device, wherein said first computing device and said second computing device are enabled to process information as a connected pair of devices.

13. The non-transitory computer-readable storage medium of claim 12, wherein said determined position of the second device utilized in forming said logical unit comprises said orientation information.

14. The non-transitory computer-readable storage medium of claim 12, wherein said modeled RSSI data is selected from a set of RSSI data models based on the determined orientation of the second device, each RSSI data model in the set corresponding to an edge of the first device and orientation of another device along said edge.

15. The non-transitory computer-readable storage medium of claim 12, further comprising:
receiving accelerometer data of the second computing device;
determining whether said second device is stationary, said determination comprising comparing said second accelerometer data against a movement threshold;
determining an offset based on the second accelerometer data when said second device is determined to not be stationary; and
applying the offset to the recorded RSSI data of the second device.

16. The non-transitory computer-readable storage medium of claim 12, wherein said RSSI data is based on signal strength of the communicated BLE signals, wherein the BLE signals produce an asymmetric radio frequency field around each device, wherein each asymmetric radio frequency field is resultant an off-set placement of an antenna on each device.

17. The non-transitory computer-readable storage medium of claim 12, further comprising:
interpolating said recorded RSSI data to modeled position around the first device having an RSSI data model, said modeled position being adjacent to said determined position.

18. A system comprising:
a first computing device comprising processor;
a non-transitory computer-readable storage medium associated with said first computing device for tangibly storing thereon program logic for execution by the processor, the program logic comprising:
identification logic executed by the processor for identifying a second device at a location;

recordation logic executed by the processor for recording received signal strength indication (RSSI) data communicated between the first and second devices, the RSSI data comprising information associated with Bluetooth Low Energy (BLE) signals exchanged between the first device and the second device;

comparison logic executed by the processor for comparing the recorded RSSI data against a RSSI data model associated with the first computing device, said comparison of the recorded RSSI data and the RSSI data model performed in accordance with a similarity threshold;

determination logic executed by the processor for determining a position of the second device with respect to the first device based on said comparison, said position determination occurring upon the recorded and modeled RSSI data comparison satisfying the similarity threshold;

determination logic executed by the processor for determining an orientation of the second device from the recorded RSSI data, said orientation comprising information indicating how the second device is situated within a plane occupied by the first device, said orientation information indicating which edge of the second device is facing the first device; and formation logic executed by the processor for forming, based on the position and orientation determinations, a logical unit comprising the first computing device and second computing device, wherein said first computing device and said second computing device are enabled to process information as a connected pair of devices.

* * * * *